(No Model.)
W. B. & J. S. CURTIS.
CORN PLANTER.
No. 283,213. Patented Aug. 14, 1883.
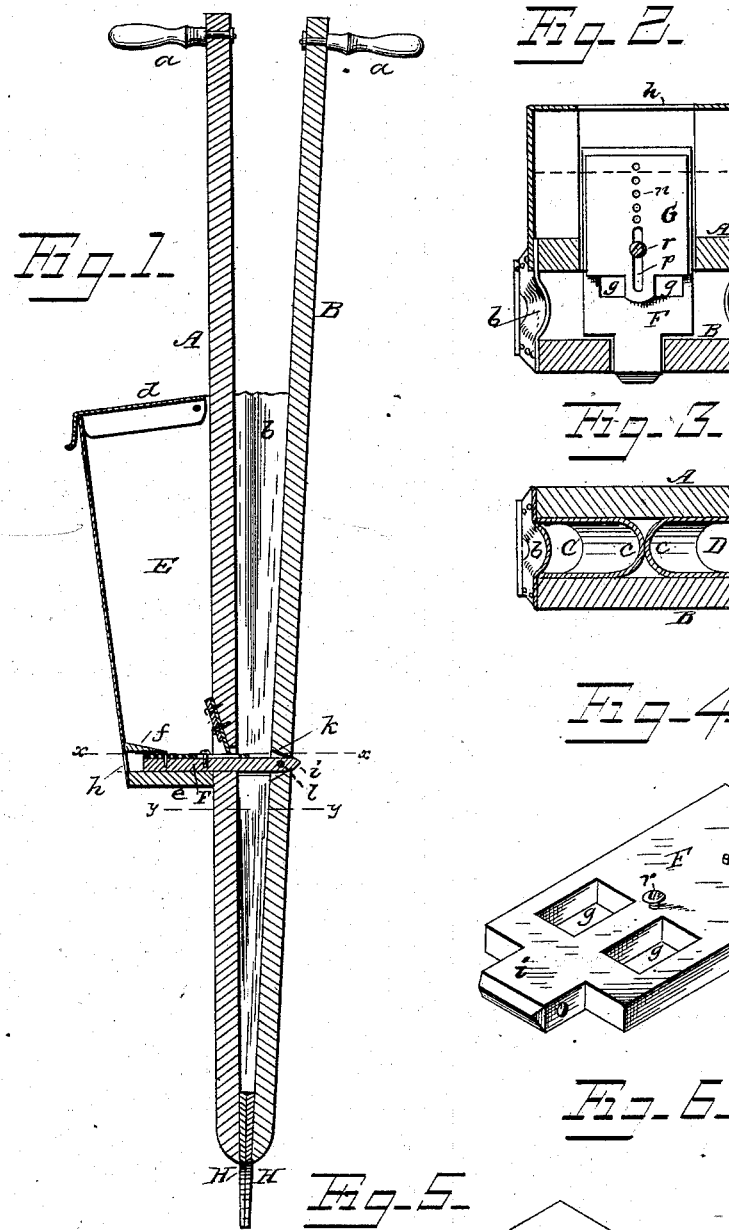
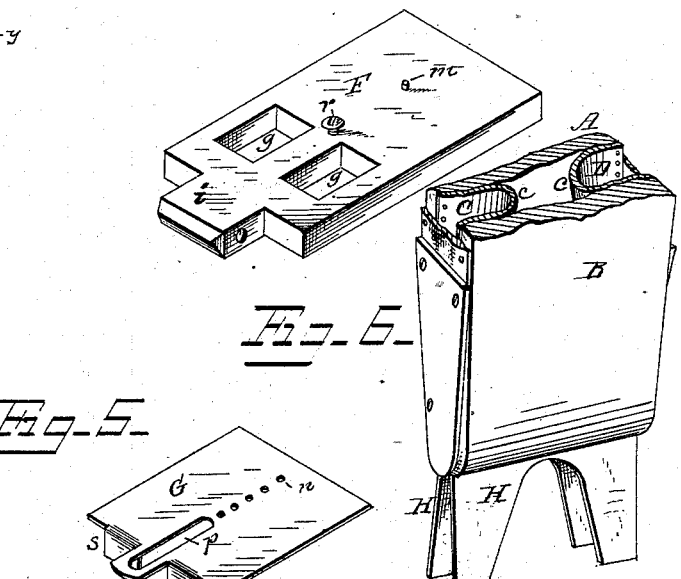
WITNESSES
F. L. Durand.
N. E. Oliphant
INVENTORS
John S. Curtis.
Wallace B. Curtis.
per Chas. H. Fowler
Attorney

UNITED STATES PATENT OFFICE.

WALLACE B. CURTIS AND JOHN S. CURTIS, OF POMEROY, OHIO.

CORN-PLANTER.

SPECIFICATION forming part of Letters Patent No. 283,213, dated August 14, 1883.

Application filed April 11, 1883. (No model.)

*To all whom it may concern:*

Be it known that we, WALLACE B. CURTIS and JOHN S. CURTIS, citizens of the United States, residing at Pomeroy, in the county of Meigs and State of Ohio, have invented certain new and useful Improvements in Corn-Planters; and we do hereby declare that the following is a full, clear, and exact description of the same, reference being had to the annexed drawings, making a part of this specification, and to the letters and figures of reference marked thereon.

Figure 1 of the drawings is a central section of a corn-planter constructed in accordance with our invention; Fig. 2, a longitudinal section taken on line $x\,x$ of Fig. 1; Fig. 3, a similar view taken on line $y\,y$ of Fig. 1. Fig. 4 is a detail view, in perspective, of the slide; Fig. 5, a similar view of the valve-plate; and Fig. 6, a detail view, in perspective, of the lower end of the planter.

This invention has relation to improvements in hand corn-planters; and it consists in the construction and arrangement of parts, as hereinafter described, and particularly pointed out in the appended claim.

In the accompanying drawings, A B represent the two sections forming the sides of the planter, having at their upper ends suitable handles, $a$, and at their lower ends, near their extremities, hinged together in any convenient manner.

The sections A B have the usual flexible sides, $b$, and flexible partitions $c$, which divide the interior of the planter into two separate conduits, C D. The section A has secured to it a suitable hopper for the corn or seed, as shown at E, the same being provided with a hinged cover, $d$, and a recessed bottom, $e$, said bottom having a bevel-cleat, $f$, secured thereto to more effectually conduct the seed or corn to the openings $g$ side by side in a slide, F. This slide F is seated in the recessed bottom $e$ of the hopper, and extends through openings $h$ in the hopper and a similar opening in the section A, the slide having a shank, $i$, extending through an opening, $k$, in the section B, and held therein by a rod, $l$, passing through a hole in said section and a hole in the shank. When it is desired to remove the slide F, the rod $l$ is withdrawn, and the slide is passed out through the opening $h$ in the front of the hopper.

The slide F, upon its upper side, has secured to it a pin, $m$, which enters one of a line of perforations $n$ in a valve-plate, G, said plate also having a longitudinal slot, $p$, to admit the adjustment of the plate to regulate the size of the openings $g$, the screw $r$ holding the plate stationary after being adjusted, and the pin further securing the plate against lateral displacement, forming together a simple, effective, and practical means for holding securely in position the plate upon the slide. The adjustability of the plate G, together with the two separate openings $g$ in the slide F, regulates the feed of the grain to the conduits C D, and also separates it.

To the lower end of the sections A B are secured bifurcated blades H, which make two separate openings in the earth for the grain. Thus by the two openings $g$ in the slide F and the two conduits C D the grain is deposited in the ground with from two to four inches of dirt between the grains in the hill.

Where corn is dropped all in a bunch, or in one opening, the roots mat or cling together to such an extent that in thinning out, the whole hill or number of stalks are pulled up, or, if broken off, several shoots or sprouts is the result. This difficulty is overcome by using a planter constructed as herein described, because it leaves a sufficient quantity of earth between the corn in the hill to keep the roots apart until the corn is large enough to be thinned. The valve-plate G, at its front end, has two tongues, $s$, bent in a downward direction at right angles to the plate, which enter the openings $g$ in the slide F, to form an additional security against lateral displacement of the plate, and more perfectly conduct the grain through the openings.

Having now fully described our invention, what we claim as new, and desire to secure by Letters Patent, is—

The combination, with the flexible hinged sections A B, having the flexible compartments C D, and hinged at their lower ends by the bifurcated blades H, of the slide F, having the shank $i$, hinged to section B, and provided with openings $g\ g$, side by side, and the adjusting-plate G, the whole constructed and arranged to operate as shown and described.

In testimony that we claim the above we have hereunto subscribed our names in the presence of two witnesses.

WALLACE B. CURTIS.
    JOHN S. CURTIS.

Witnesses as to Wallace B. Curtis:
  W. W. MERRICK,
  O. L. BRADBURY.

Witnesses as to John S. Curtis:
  E. W. JOHNSON,
  ELIJAH STONE.